March 9, 1971  R. F. CARELLA  3,568,366
MULTIPLE PANE VEHICLE WINDOW

Filed April 7, 1969  3 Sheets-Sheet 1

INVENTOR.
Richard F. Carella
BY
Herbert Furman
ATTORNEY

March 9, 1971  R. F. CARELLA  3,568,366
MULTIPLE PANE VEHICLE WINDOW
Filed April 7, 1969  3 Sheets-Sheet 2

INVENTOR.
Richard F. Carella
BY
Herbert Furman
ATTORNEY

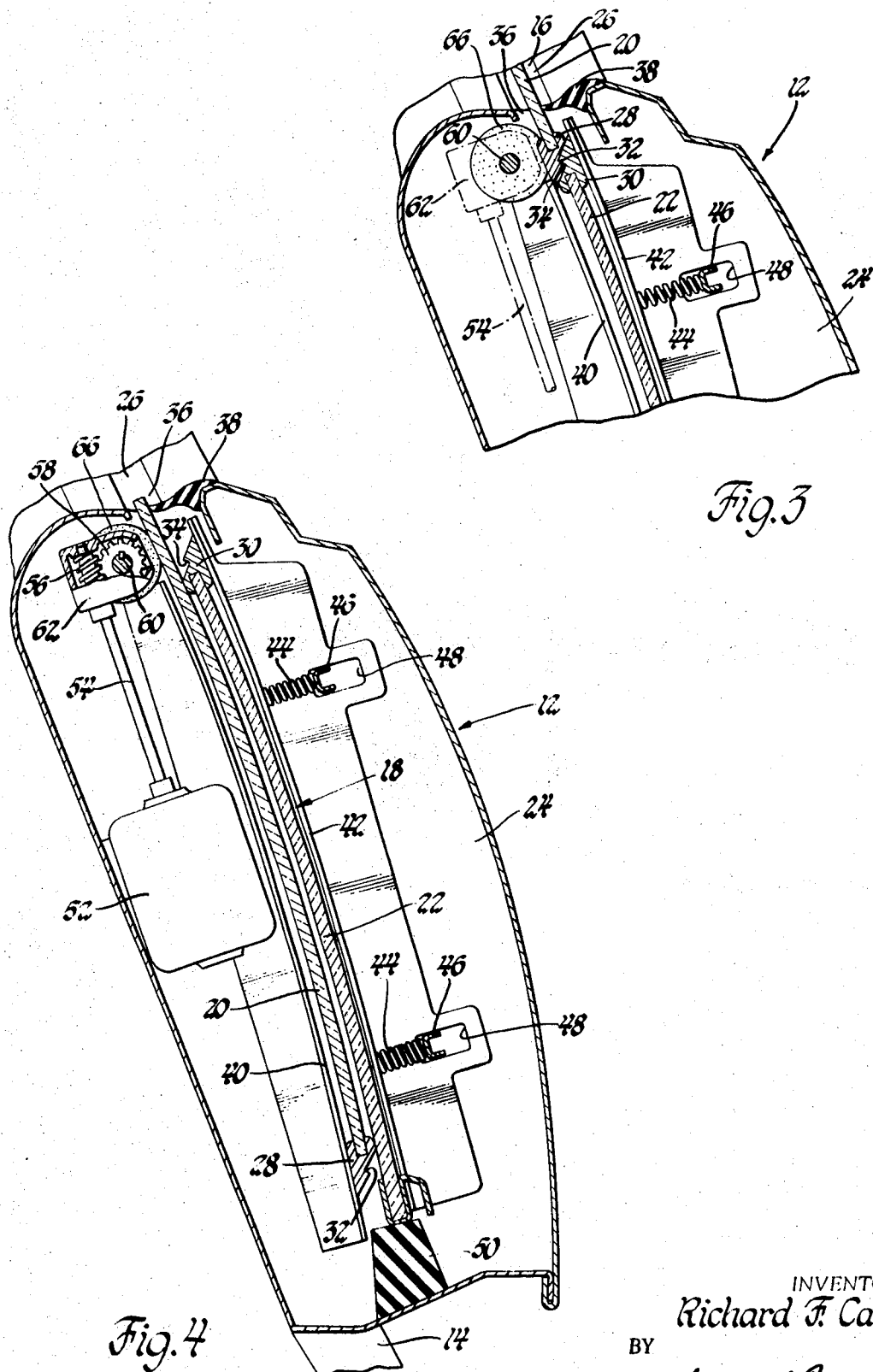

United States Patent Office 3,568,366
Patented Mar. 9, 1971

3,568,366
MULTIPLE PANE VEHICLE WINDOW
Richard F. Carella, Mount Clemens, Mich., assignor to General Motors Corporation, Detroit, Mich.
Filed Apr. 7, 1969, Ser. No. 813,992
Int. Cl. E05f 15/08
U.S. Cl. 49—349                            6 Claims

ABSTRACT OF THE DISCLOSURE

A vehicle body has a plurality of window panes which are movable between a closed position in which the panes cover a body opening in edge to edge continuation and an open position wherein the panes are disconnected and stored juxtaposed to each other in a storage compartment communicating with the opening. A guide arrangement is provided for guiding the panes between the open and closed positions and a driving arrangement is provided for moving the window panes between open and closed positions.

---

This invention relates to vehicle windows and more particularly to vehicle windows including a pluarlity of window panes.

Conventionally, vehicle window openings are opened and closed by a single window pane of glass. The opening is fully opened by moving the pane of glass to a stored position within a storage compartment, usually below the opening. The storage compartment must be as deep, if not deeper, than the greatest height of the window opening. This limitation is true whenever the window pane is stored below the opening no matter where the window is located in a vehicle door, a vehicle side panel or a vehicle tailgate.

Various proposals have been made to provide multiple pane windows for vehicles wherein the opening height is greater than the depth of the storage space. These proposals have the disadvantage of requiring complicated regulator mechanisms for sequentially moving each of the panes between open and closed positions. Often the storage compartment must be unnecessarily wide and deep to accommodate the mechanisms and window panes therein.

To overcome these disadvantages, this invention provides a multiple pane vehicle window wherein the panes cooperate with each other and with a drive means for movement between a closed position in which the panes cover an opening in edge to edge continuation and an open position wherein the panes are disconnected and stored juxtaposed to each other in a minimum depth and width storage compartment communicating with the opening.

Therefore, it is an object of this invention to provide a multiple pane vehicle window wherein the panes are releasably interlocked in edge to edge continuation of each other during movement between open and closed positions with respect to the window opening. It is a further object of this invention to provide such a window wherein the interlocked panes are sequentially engageable by a drive means for movement as a unit. It is yet a further object of this invention to provide such a window wherein the panes are provided with interlocking strips which automatically engage each other as the drive means moves one of the panes from a stored position juxtaposed to the other toward the closed position to move the panes as a unit from a stored open position to a closed position wherein the panes close the opening in edge to edge continuation of each other. It is another object of this invention to provide such a window wherein the panes automatically disconnect as the drive means moves one of the panes within the storage compartment to allow the drive means to move the other pane within the storage compartment juxtaposed to the one pane.

These and further objects of the invention will become apparent from the following detailed description and drawings in which:

FIG. 3 is an enlarged view of a portion of FIG. 1 with the window in a position midway between open and closed;

FIG. 4 is a view of a portion of FIG. 1 with the window in open position within the station wagon tailgate.

Figure 1:
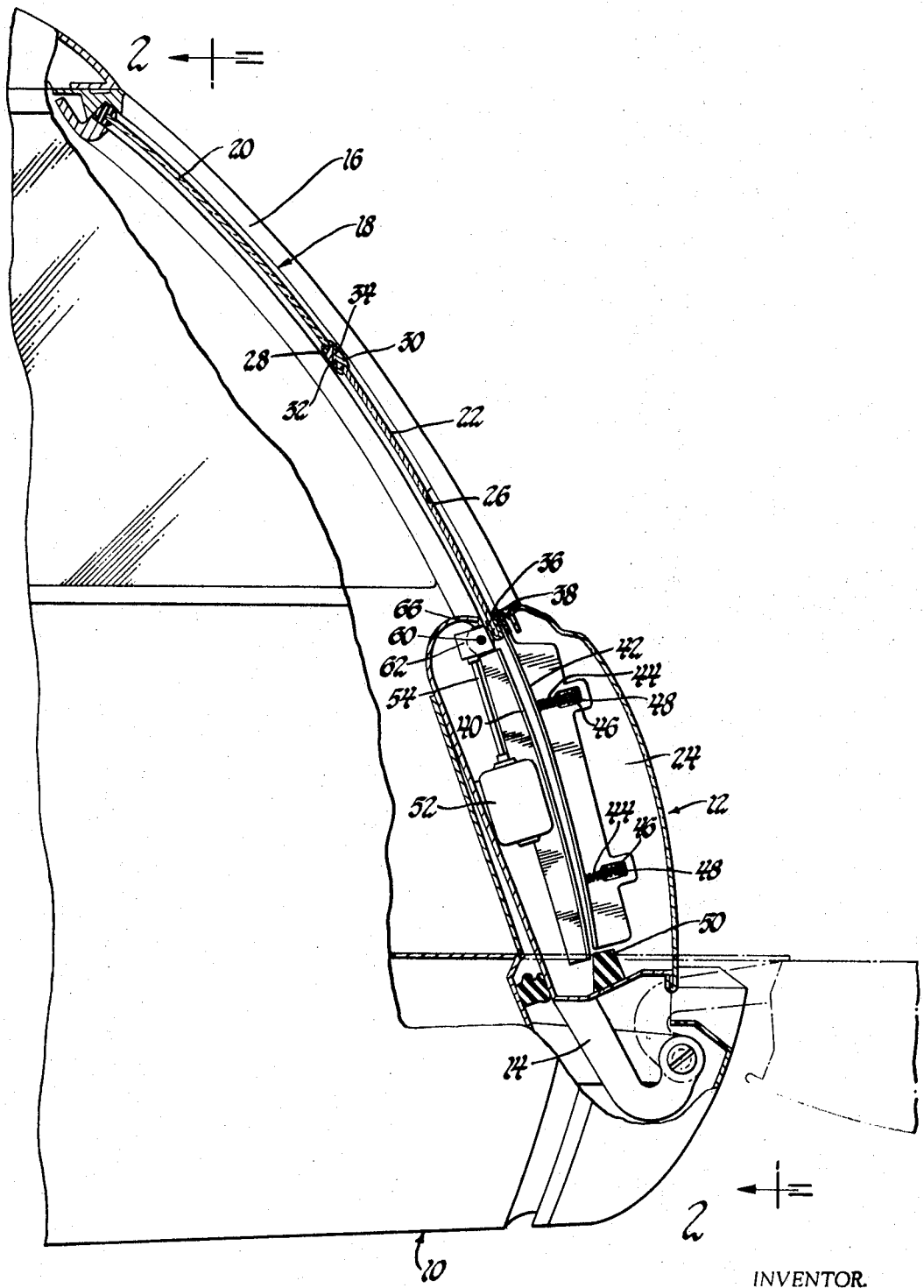
FIG. 1 is a partially cut-away view of a rear portion of a station wagon having a station wagon tailgate mounting a window according to this invention, with the window shown in the closed position.
Figure 2:
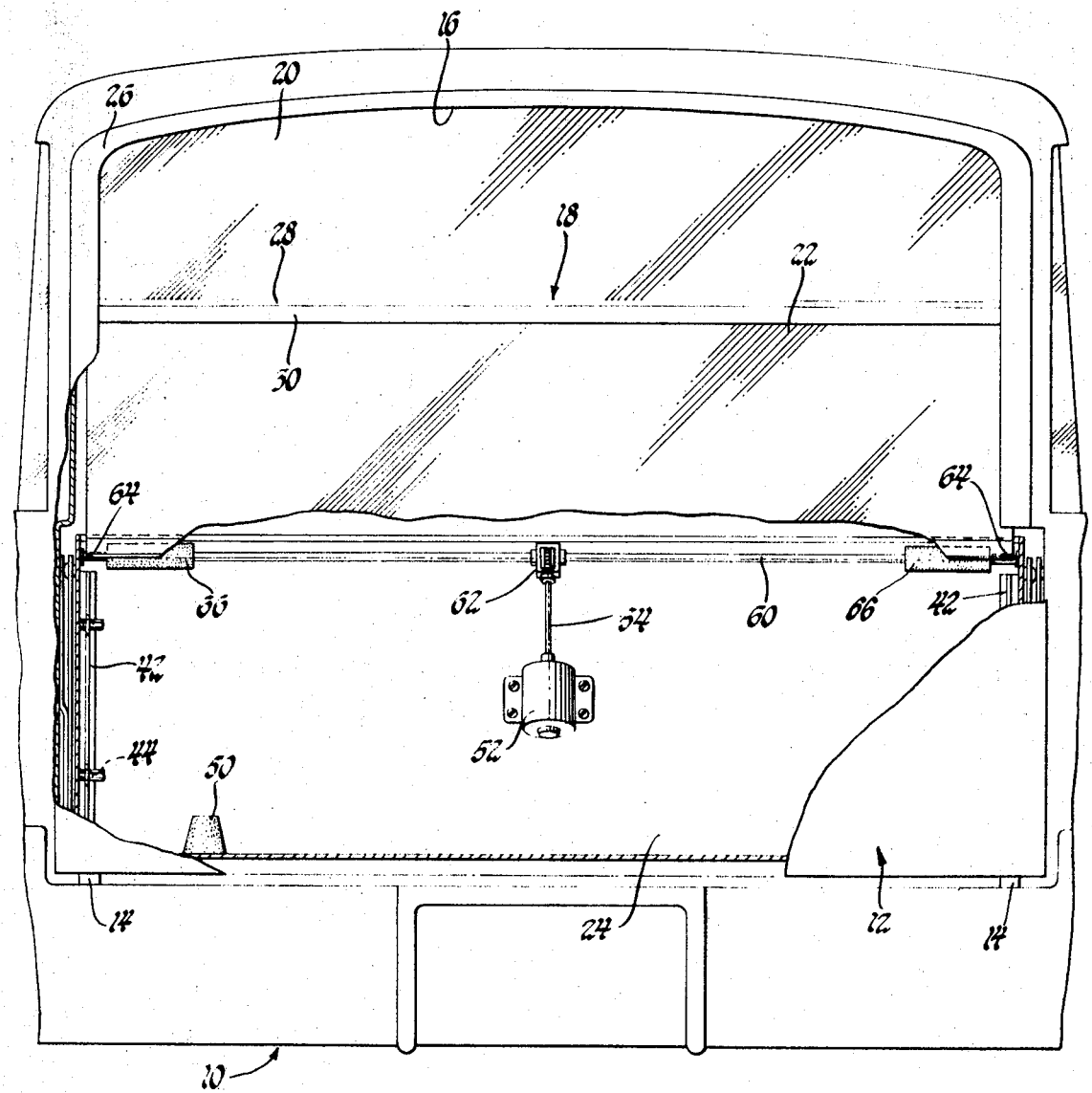
FIG. 2 is a partially cut-away view taken along the line 2—2 of FIG. 1.

Referring now to FIGS. 1 and 2 of the drawings, a conventional station wagon body 10 includes a rear tailgate 12 swingably mounted on the body by gooseneck arms 14 for movement between a closed position, shown in FIG. 1 in full lines and an open position shown in dashed lines. When the tailgate 12 is in the closed position, the upper edge of the tailgate and the rear pillars and rear header of the body define a window opening 16. The opening 16 is opened and closed by a vehicle window 18 according to this invention which includes a pair of window panes 20 and 22 movable between a closed position as shown in FIG. 1 wherein the panes 20 and 22 are located in an edge to edge continuation of each other and an open position shown in FIG. 4 wherein the panes are disconnected and located in juxtaposed relation to each other within a storage compartment 24 of the tailgate 12.

When the panes 20 and 22 are in closed position, the side edges thereof and the upper edge of pane 20 are sealingly received within conventional guide channels 26 secured to the rear pillars and header of the body 10. The adjacent edges of the panes 20 and 22 are connected by an upper and lower like interlocking strips 28 and 30 secured to the upper and lower edges of the panes 22 and 20, respectively. The strips 28 and 30 each have respective like ribs 32 and 34 which engage to connect the panes 20 and 22 to each other in edge to edge continuation to close the opening 16. The strips 28 and 30 also seal the adjacent edges of the panes.

The lower edge of pane 22 extends through the upper opening 36 in tailgate 12 to the storage compartment 24 and is sealed by a conventional seal 38.

The window 18 is movable, as will be described, from a closed position shown in FIGS. 1 and 2 to an open position shown in FIG. 4 wherein the panes are disconnected and located in juxtaposed relationship to each other within the storage compartment 24. In open position, the side edges of the forward surface of pane 20 engages forward guide members 40 mounted to the side walls of the storage compartment 24 and form a continuation of the guide channel 26 within the storage compartment. The side edges of the rear or outer surface of the pane 22 engage rear guide members 42 which are movably mounted within the storage compartment 24 for motion to and away from the forward guide members 40. The rear guide members 42 are biased toward the forward guide members 40 by like sets of compression springs 44 seated between the members 42 and brackets 46 secured to the side walls of the storage compartment 24. The brackets 46 extend laterally to slots 48 of the members 42 to guide the movement of the brackets 46 with respect to the members 40. When the panes 20 and 22 are in the storage compartment 24, they rest on bottom stops 50 mounted to the bottom wall of the storage compartment 24.

The tailgate 12 has mounted on its forward wall, a reversible electric motor 52 which is occupant controlled for rotation in either direction. The electric motor 52 has an output shaft 54 drivingly connected by a worm 56 and worm wheel 58 to a horizontal shaft 60. The worm 56 and worm wheel 58 are encased in a gear box 62 which also rotatably supports the center portion of the shaft 60. The ends of the horizontal shaft 60 are rotatably supported by brackets 64. Friction drive rollers 66 are secured to the shaft 60 adjacent the brackets 64 for frictionally engaging the forward surface of the panes 20 and 22 to move them between open and closed positions.

When the window is in the closed position, as shown in FIG. 1, it is opened by energizing the motor 52 to rotate the drive rollers 66 clockwise. Clockwise movement of the drive rollers 66 moves pane 22 downwardly pulling pane 20 downwardly via the interengaging ribs 32 and 34 of the strips 28 and 30. The window pane 22 continues downwardly along the guide channels 26 and along the guide members 40 and 42 until it engages the bottom stops 50 which halt its downward movement. Simultaneously, as the pane 22 engages the bottom stops 50, the friction drive rollers 66 move from the pane 22 to the pane 20.

The rollers 66 then move the pane 20 downwardly relative to pane 22. As the pane 20 moves downwardly, the ribs 32 and 34 disengage to unlock pane 20 from pane 22 as shown in FIG. 3. Continued downward movement of the pane 20 wedges the pane 20 between forward guide members 40 and pane 22 to force the pane 20 and the rear guide members 42 rearwardly of the vehicle body 10 against the biasing of springs 44. The rearward movement of the pane 22 and the rear guide members 42 enables the pane 20 to be driven downwardly between the forward guide members 40 and the pane 22 into a juxtaposed position within the compartment 24. The friction drive rollers 66 continue to move the pane 20 downwardly until it engages the bottom stops 50, thus completing opening of the window opening 16 of the vehicle window 18.

With the window 18 fully open, the tailgate 12 is free to conventionally be moved between open and closed positions as desired.

To close the window 18, the process is reversed. The electric motor 52 is energized oppositely to rotate the friction drive rollers 66 counterclockwise. As best shown in FIG. 4, when the panes 20 and 22 are disconnected and stored in the juxtaposed position, the friction drive rollers 66 engage the forward surface of pane 20 so that counterclockwise rotation thereof will drive pane 20 upwardly along the forward guide members 40 and into the guide channel 26. As the pane 20 moves out of compartment 24, the ribs 32 and 34 of the strips 28 and 30 cooperate to interlock the panes 20 and 22 under the action of springs 44 acting on guide members 42 for movement of the panes as a unit. After the ribs 28 and 30 interlock, the friction drive rollers 66 move from the pane 20 to the pane 22 to drive both panes upwardly as a unit until pane 20 engages the upper part of guide 26 to fully close the opening 16.

Thus, a window constructed according to this invention has a window opening closed by a plurality of window panes in edge to edge continuation. The panes are moved into a storage area adjacent the window opening to be disconnected and stored in a juxtaposed position. Such a window provides an increased window opening height and a smaller storage area depth.

While the window has been shown and described in conjunction with a station wagon rear opening, it should be understood that the window is equally applicable to other openings wherein an increased window opening height and a low storage compartment depth are desirable.

I claim:

1. In a vehicle body having a window opening therein and a storage compartment communicating with the opening, the combination comprising, a plurality of window panes movable between a first position across the opening wherein the panes are connected in edge to edge continuation of each other to close the opening, and a second position within the storage compartment wherein the panes are disconnected and located juxtaposed to each other to open the opening, means for selectively connecting and disconnecting the panes during movement thereof between the first position and the second position, and drive means for engaging one of the panes when the panes are connected and also engaging the other pane when the panes are disconnected to effect movement of the panes between the first position and the second position.

2. In a vehicle body having an opening therein and a storage compartment communicating with the opening, the combination comprising, a plurality of window panes movable between a first position across the opening wherein the panes are in an edge to edge continuation of each other to form a continuous window to close the opening and a second position within the storage compartment wherein the panes are disconnected and located juxtaposed to each other to open the opening, cooperating means on respective adjacent edges of the panes operable to connect the panes to each other for unit movement to and from the first position and operable to disconnect one pane from the other pane to permit the one pane to move relative to the other pane to and from the second position when the other pane is in the second position, and drive means housed in the storage compartment for sequentially engaging the panes to provide movement of the one pane when the panes are disconnected and movement of both of the panes when the panes are connected to effect movement of the panes between the first position and the second position.

3. In a vehicle body having a window opening therein and a storage compartment communicating with the opening, the combination comprising, a pair of window panes movable between a first position across the opening wherein the panes are in an edge to edge continuation of each other to close the opening and a second position within the storage compartment wherein the panes are disconnected and located juxtaposed to each other to open the opening, means for connecting the panes to move as a unit to and from the first position and disconnecting the panes to permit one pane to move relative to the other pane when the other pane is in the second position, drive means for engaging one pane when the panes are connected to move the one pane and the other pane as a unit towards and also away from the first position and engaging the other pane when the one pane is in the second position to move the other pane relative to the one pane towards and also away from the second position.

4. In a vehicle body having a window opening therein and a storage compartment communicating with the opening, the combination comprising, a pair of window panes movable between a first position across the opening wherein the panes are located in an edge to edge continuation of each other to close the opening and a second position within the storage compartment wherein the panes are disconnected and located juxtaposed to each other to open the opening, drive means housed in the storage compartment for sequentially engaging the panes to successively move the panes toward and away from the first position and the second position, and means for connecting the panes to move as a unit towards and away from the first position and disconnecting the panes to permit one pane to move relative to the other pane towards and away from the second position when the other pane is in the second position.

5. In a vehicle body having a window opening therein and a storage compartment to one side of the opening communicating with the opening, the combination comprising, guide means mounted within the storage compartment and including a pair of relatively movable guide members, a plurality of window panes movable between a first position across the opening wherein the panes are located in an edge to edge continuation of each other to form a continuous window to close the opening and a second position between the guide members wherein the panes are juxtaposed to each other to open the opening, first and second means mounted on adjacent edges of the window panes for connecting the window panes together as one pane moves from the second position to the first position for movement of the panes as a unit to the first position and disconnecting the panes as the panes move from the first position to the second position when the other pane has moved to the second position for independent movement of the one pane to the second position, drive means for sequentially engaging the window panes to move the panes betwen the first and second positions, and biasing means for biasing the guide members toward each other to guide movement of the panes while maintaining the panes in successive engagement with the drive means and urging the first and second means to connect the panes as the one pane moves from the second position to the first position and also permitting the first and second means to disconnect the panes as the one pane moves from the first position to the second position.

6. In a vehicle body having a window opening therein and a storage compartment below the window opening and communicating therewith, the combination comprising, guide means in the storage compartment and including a pair of relatively movable guide members, biasing means biasing the pair of relatively movable guide members together, means maintaining the relatively movable guide members in predetermined spaced relationship, upper and lower window panes movable between a first position across the opening wherein the lower pane is releasably connected and located under the upper pane in edge to edge continuation to close the opening and a second position within the storage compartment wherein the lower pane is disconnected from the upper pane and is juxtaposed to the upper pane to open the opening, upper and lower cooperating means mounted respectively to the lower and upper edges of the upper and lower window panes for connecting the panes together as the upper pane moves from the second position to the first position and disconnecting the panes as the lower pane moves to the second position, and friction drive means including friction drive wheels sequentially frictionally engageable with the panes for moving the panes as a unit from the first position to the second position until the lower pane moves to the second position and then moving the upper pane to the second position and also moving the upper window pane from the second position toward the first position to connect the panes and then moving the lower pane and upper pane as a unit to the first position with the guide members and the biasing means cooperating with the upper and lower cooperating means to effect connection of the lower pane to the upper pane as the upper pane moves from the second position towards the first position and with the upper and lower cooperating means cooperating with the friction drive means to disconnect the panes to permit movement of the upper pane to the juxtaposed position against the action of the guide members and the biasing means after the lower pane has moved to the second position.

References Cited

UNITED STATES PATENTS

| | | | |
|---|---|---|---|
| 1,891,478 | 12/1932 | Meatheringham | 49—374X |
| 2,779,401 | 1/1957 | Bascom | 160—37 |

J. KARL BELL, Primary Examiner

U.S. Cl. X.R.

49—40, 103, 127